United States Patent [19]
Tognazzini

[11] Patent Number: 5,907,293
[45] Date of Patent: May 25, 1999

[54] SYSTEM FOR DISPLAYING THE CHARACTERISTICS, POSITION, VELOCITY AND ACCELERATION OF NEARBY VEHICLES ON A MOVING-MAP

[75] Inventor: Bruce Tognazzini, Woodside, Calif.

[73] Assignee: Sun Microsystems, Inc., Palo Alto, Calif.

[21] Appl. No.: 08/671,293

[22] Filed: Jul. 1, 1996

Related U.S. Application Data

[63] Continuation-in-part of application No. 08/655,133, May 30, 1996.

[51] Int. Cl.[6] ............................................. B60Q 1/00
[52] U.S. Cl. ........................... 340/903; 340/436; 340/988; 340/990; 342/455; 367/909
[58] Field of Search ..................................... 340/436, 901, 340/902, 903, 904, 933, 943, 988, 989, 990; 342/455; 367/909

[56] References Cited

U.S. PATENT DOCUMENTS

| | | | |
|---|---|---|---|
| 4,104,638 | 8/1978 | Middleton | 340/906 |
| 5,083,125 | 1/1992 | Brown et al. | 340/902 |
| 5,153,836 | 10/1992 | Fraughton et al. | 340/961 |
| 5,210,534 | 5/1993 | Janex | 340/984 |
| 5,404,135 | 4/1995 | Janex | 340/988 |
| 5,504,482 | 4/1996 | Schreder | 340/988 |
| 5,515,419 | 5/1996 | Sheffer | 340/539 |
| 5,539,645 | 7/1996 | Mandhyan et al. | 340/995 |
| 5,612,883 | 3/1997 | Shaffer et al. | 340/903 |

*Primary Examiner*—Edward Lefkowitz
*Attorney, Agent, or Firm*—McDermott, Will & Emery

[57] ABSTRACT

Proximity radar mounted in a vehicle determines the location of other vehicles. Other vehicles detect their own positions and broadcast those positions to all surrounding vehicles. Vehicle position data is plotted on a moving map so the driver can see the location of other vehicles, in some cases with an icon color which matches vehicle color(s). A driver can open a communication link with drivers who are projected to constitute a collision threat. A fixed radar unit can be positioned at blind intersections and broadcast vehicle location information for vehicles not equipped with the ability to track their own locations.

6 Claims, 11 Drawing Sheets

700 DATE/TIME PACKET WAS CREATED

710 GPS COORDINATES

720 RADIO FREQUENCY MONITORED FOR VOICE COMMUNICATION (OPTIONAL)

730 VELOCITY (OPTIONAL)

740 DIRECTION (OPTIONAL)

750 ACCELERATION (OPTIONAL)

760 CAR MAKE/MODEL

770 CAR COLOR

Figure 7

SYSTEM FOR DISPLAYING THE CHARACTERISTICS, POSITION, VELOCITY AND ACCELERATION OF NEARBY VEHICLES ON A MOVING-MAP

RELATED APPLICATIONS

This is a continuation in part of U.S. application Ser. No. 08/655,133, filed May 30, 1996, by the same inventor and entitled "LOCATION/STATUS-ADDRESSED RADIO/RADIO TELEPHONE which application is hereby incorporated by reference herein in its entirety.

BACKGROUND OF THE INVENTION

1. Field of the Invention

The invention relates to the field of collision avoidance systems, and, more particularly, to collision avoidance systems utilizing proximity radar on a vehicle and vehicle location radar located at blind intersections to prevent collisions.

2. Description of Related Art

The driver of an automobile is often deprived of information that would enhance his ability to operate the vehicle safely. Information concerning other vehicles in the immediate vicinity, which are those most relevant to the driver, is gleaned by visual inspection of those vehicles. Mirrors provide a means to locate and view vehicles behind and beside the driver's vehicle, but the view is obstructed by "blind-spots" and certain optical qualities of mirrors make other vehicles appear to be farther away then they actually are. The driver is able to gather even less information during poor weather conditions and during the night. Blind intersections, as the name implies, provide no information to the driver about approaching vehicles.

Moving map displays, common in rental automobiles in conjunction with global positioning satellite receivers, provide information to the driver about his location or about his location relative to his destination. In addition to helping the driver navigate, the information content of the display adds to the driver's ability to safely operate the vehicle. For example, the display allows the driver to plan lane changes in advance which helps prevent rapid, and sometimes reckless, lane changes in order to reach a desired exit ramp.

A type of radar termed micropower impulse radar or MIR, is known in the art. The radar is described in an article entitled "Radar on a Chip 101 Uses in Your Life: in the March 1995, issue of *Popular Science*. This publication is herein incorporated by reference and the radar unit is available commercially, e.g., Radio Shack retail stores.

The MIR is also discussed in an article at http://www-lasers.llne.gov/lasers/idp/mir/overview.html, the website for Lawrence Livermore National Laboratories, which is hereby incorporated by reference.

The micropower impulse radar (MIR) is a fundamentally different type of radar that was invented at Lawrence Livermore National Laboratory. It is a pulse radar, like other wide ultra-wide band radars, but it emits much shorter pulses than most and, it is built out of a small number of common electronic components, it is compact and inexpensive.

One unique feature of the MIR is the pulse generation circuitry, which, while small and inexpensive, has never before been considered in radar applications. Each pulse is less than a billionth of a second and each MIR emits about 2 million of these pulses per second. Actual pulse repetition rates are coded with random noise to reduce possibility of interference from other radars, while each is tend to itself. The same pulse is used for transmitting to send via the transmit as for sampling the receive signal.

Three direct advantages of the short pulse-width are:

1. The pulse is short, the MIR operates across a wider band of frequencies on a conventional radar, giving high resolution and accuracy, but almost making it less susceptible to interference from other radars.
2. Since current is only drawn during this short pulse time and the pulses are infrequent, there are extremely low power requirements. One type of MIR unit can operate for years on a single AA battery.
3. The microwaves emitted by the pulse are at exceedingly low and therefore mechanically safe levels (microwatts). Indeed, the MIR emits less than one millionth of the energy of the cellular telephone. An MIR radar can utilize range gating to selectively include or exclude signals from certain range intervals.

Currently, automobile occupants are limited in their ability to communicate with the occupants of other vehicles. Certain international signs and signals for happiness and displeasure can be issued, but conversation is only possible via CB or ham radio, both in use by limited, well-defined populations.

Global positioning satellite (GPS) receivers are known that can provide accurate information about the geographic location of the receiver and, by extension, the location of an object containing a GPS receiver.

Computational techniques are known that allow the determination of speed, acceleration, and direction of a moving GPS receiver that are based upon time interval interpretation of the GPS receiver's data points.

Radio broadcast of digital data is known. Self organizing communications protocols are known and were designed to assure accurate transmission of digital data even though there may be contention for a particular frequency. Such a protocol is preferably a carrier sense multiple access/collision detection (CSMA/CD) protocol.

Eyetracking devices are known particularly in conjunction with heads up displays in certain control applications in aircraft. An eyetracker device monitors the eyes of a user and calculates the direction in which the user is looking and, in some applications, the particular point in three dimensional space on which the user's eyes focus.

One commercial eyetracker is the Dual-Purkinje-Image (DPI) Eyetracker, manufactured by Forward Optical Technologies, Inc. of El Cajon, Calif. It determines the direction of gaze over a large two dimensional visual field with great accuracy and without any attachments to the eye. It operates with infra-red light which is invisible to the subject and does not interfere with normal vision. The eyetracker has a pointing accuracy on the order of one minute of arc and response time on the order of one millisecond. One can utilize the DPI Eyetracker with an infra-red optometer to allow a continuous measure of eye focus, producing a three dimensional eyetracker.

Touch screen displays, where the user indicates his choice by touching it on the display screen, are known.

THE PROBLEMS

The prior art offers only limited capabilities to a driver to identify nearby drivers who might constitute a threat. Similarly, the prior art provides even fewer capabilities to communicate with other drivers.

SUMMARY OF THE INVENTION

The present invention provides apparatus, systems, and methods and computer program products for overcoming the problems of the prior art set forth above. This is done by obtaining information about other vehicles location relative to the driver's vehicle. This is accomplished in several ways.

Each vehicle is equipped with a computing device, GPS receiver, proximity radar device and a radio transceiver. This system is used to continuously broadcast a vehicle's position to other vehicles. Other vehicles, similarly equipped, receive the position information, compare it to their own positions and determine the actual distance between the vehicles which is then displayed (to scale) as icons representing vehicles on a driver's display unit. In addition to position information, the system optionally transmits information such as car make/model, color, direction, acceleration and velocity which may be used to enhance the information content of the icons on the moving-map display.

To detect those vehicles that are not equipped with the system, the driver's vehicle would utilize the proximity radar device. The azimuth and distance of detected vehicles is immediately known and appropriate calculations can be made on the radar echoes returned over time to determine direction, velocity and acceleration. This information is converted into iconic form and placed on the driver's display.

The detection system is further enhanced by the placement of stationary radar devices at particularly dangerous intersection, roadways or areas. The radar would detect all vehicles and, by utilizing a vehicle's immediate history, determine its direction, speed and acceleration. In order to share this information with enabled vehicles, the radar device would convert the information on each vehicle into the format an enabled vehicle would expect and then broadcast it. The effect is to mimic the transmissions that would have been received from vehicles with working transmitter systems. In order to alert the driver that this information originated from the radar system and not from vehicles the icons on the display would be displayed in a different format.

The system would also allow any occupant of the vehicle to open a radio communication link with other enabled vehicles by touching the icon representing the vehicle with which communication is desired and activating the radio communications device. The target vehicle of such radio communication would be able to ignore requests to establish a communications link.

An eyetracker could identify a particular icon at which a driver was looking and, when preceded by one or more key words, activate a communication link to the vehicle identified by said icon.

The invention would thus also alert the driver of potential collisions with other vehicles. By projecting the path of each vehicle it is possible to determine those vehicles with collision potential. If collision potential is detected, the system would announce a warning and/or the appropriate avoidance action to be taken to avoid a collision.

The invention relates to apparatus mounted in a vehicle for avoiding collisions, including a GPS receiver, a transceiver, and a computer connected to the GPS receiver and to the transceiver and configured to receive location information from the GPS receiver and transmit it over the transceiver for reception by other vehicles. A moving map display is used for displaying location of other vehicles received over the transceiver. A proximity radar is also connected to the computer for detecting the location of vehicles not equipped with location sending capability. The computer is configured to display the location of vehicles detected by the proximity radar on the moving map display. Vehicles not equipped with location sending capability are displayed using a different representation from vehicles which are equipped. Additional information, including vehicle color information may be transmitted with the location information over the transceiver for reception by other vehicles. Vehicle locations are displayed on the moving map display in colors based on the color information received with the location information. The computer determines which, if any, other vehicles constitute a collision threat based on location information received from the vehicles. If a vehicle constitutes a threat, an audio communication link is established with the other vehicle.

The invention also relates to apparatus, mounted near an intersection, for avoiding collisions, including a proximity radar, a transceiver, and a computer connected to the proximity radar and to the transceiver and configured to receive vehicle location information from the proximity radar and transmit the location of vehicles detected by the proximity radar over the transceiver for reception by other vehicles.

The invention is also directed to a method of avoiding collisions, by determining the location of a vehicle, and transmitting that location to other vehicles.

The invention is also directed to a method of avoiding collisions, by receiving vehicle location information from other vehicles, calculating whether a vehicle is a collision threat based on received location information, and alerting an operator if a collision threat exists.

The invention also relates to a method of avoiding collisions, by locating vehicles using a proximity radar, and transmitting vehicle locations to other vehicles.

The invention also relates to a system for avoiding collisions, including a plurality of vehicles equipped with a global positioning satellite receiver for determining vehicle location, the vehicles each having a transceiver for transmitting its location and receiving location information from other vehicles and a computer for determining from received location information whether another vehicle constitutes a collision threat, and an alarm for alerting a vehicle operator if a collision threat exists.

The invention also relates to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description is which:

FIG. 7 is a diagram of an exemplary structure of the data portion of the packet format in FIG. 6.

DESCRIPTION OF THE PREFERRED EMBODIMENT

Figure 1:
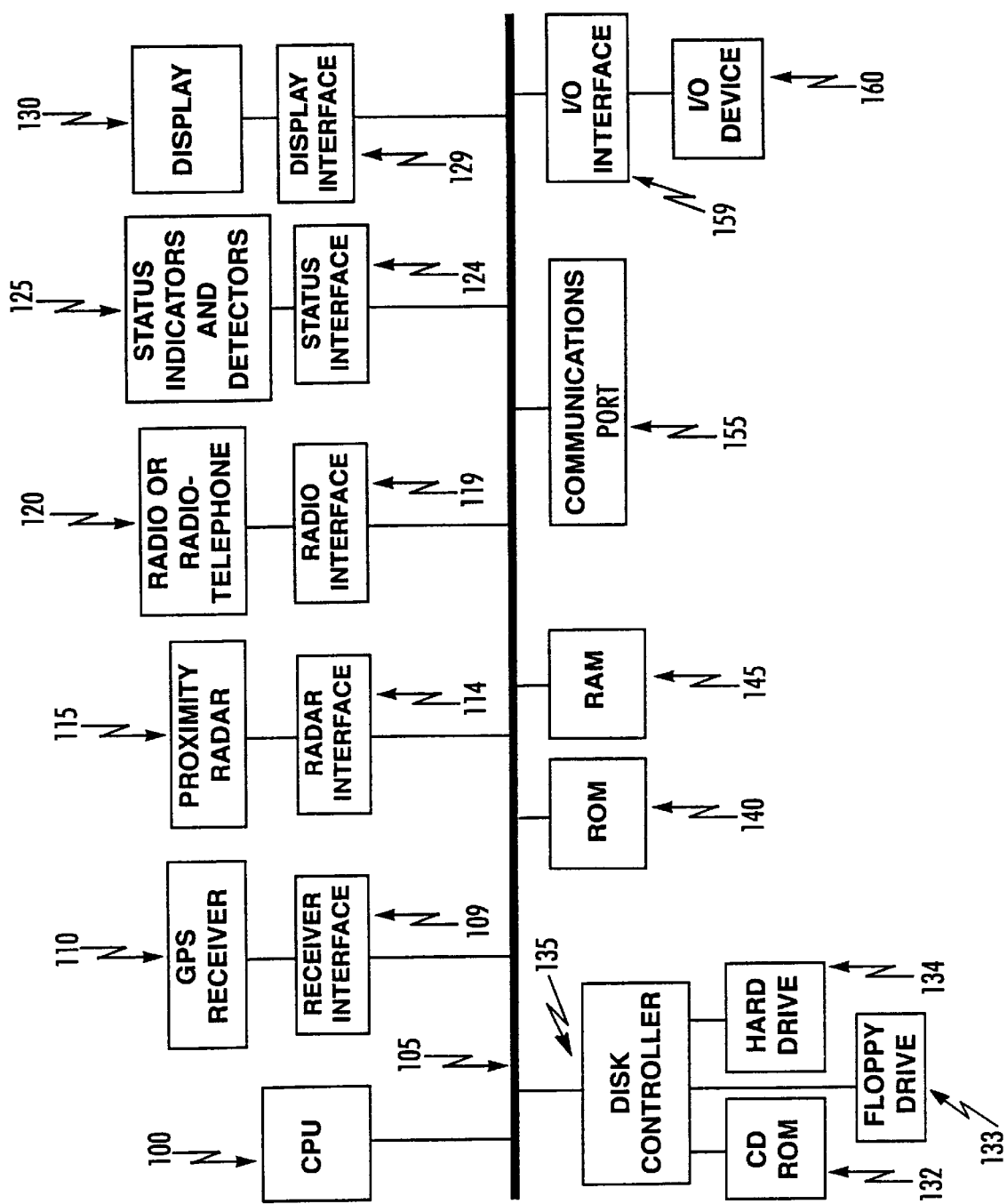
FIG. 1 is a block diagram of an apparatus suitable for carrying out that portion of the invention that resides within a vehicle.

FIG. 1 is a block diagram of an apparatus suitable for carrying out that portion of the invention that resides within a vehicle. It has a bus 105 and a CPU 100 which does all processing associated with information used in accordance with the invention. GPS receiver 110, connected to the bus by receiver interface 109, detects the current location of the GPS receiver antenna. When the invention is built into a vehicle, this is the same as the location of vehicle. When used in a vehicle environment, CPU 100 may serve as a controlling CPU for all vehicle functions.

Proximity radar 115 and radar interface 114 are also connected to the bus. The use of radar is optional but has capabilities that are useful in various circumstances as described more hereinafter.

Radio transceiver or radio telephone 120 are connected via radio interface 119 to the bus. For some embodiments, radio would be preferred whereas in others, radio telephone would be preferred. Which would preferred in a particular is apparent from the context.

Status indicators and detectors 125 are interfaced to the bus over status interface 124. As will be seen hereinafter, information about vehicle status as indicated by various sensors is sometimes utilized in accordance with the invention.

Display 130 is connected to the bus over display interface 129. Display 130 is preferably a color touch screen display.

Optional disk controller 135 manages one or more disk drives which could be CD ROM 132, floppy drive 133 or hard drive 134. These drives are merely symbolic of a number of disc drives which might be accommodated by the computer system. Typically, these would include a floppy disc drive such as 133, a hard disc drive such as 134, and a CD ROM drive indicated by 132. The number and types of drives varies, typically, with different computer configurations.

Bus 105 serves as a main information highway interconnecting the other components of the computer. A CPU 100 is a central processing unit of the system, performing calculations and logic operations required to execute a program. Read only memory 140 and Random Access Memory 145 constitute the main memory of the computer. The disc controller 135 and associated drives are convenient, but optional if other means are available for loading programming and other information into the computing system. Such an alternative might be plugging in preprogrammed ROM into a socket connected to the computer bus.

Communications port 155 is optional but would typically constitute an RS 232 slot for connection to external devices. I/O devices 160, such as a mouse or a keyboard are connected to the bus over I/O interface 159. The use and operation of the various devices connected to the bus will become apparent from descriptions given hereinafter.

Figure 2:
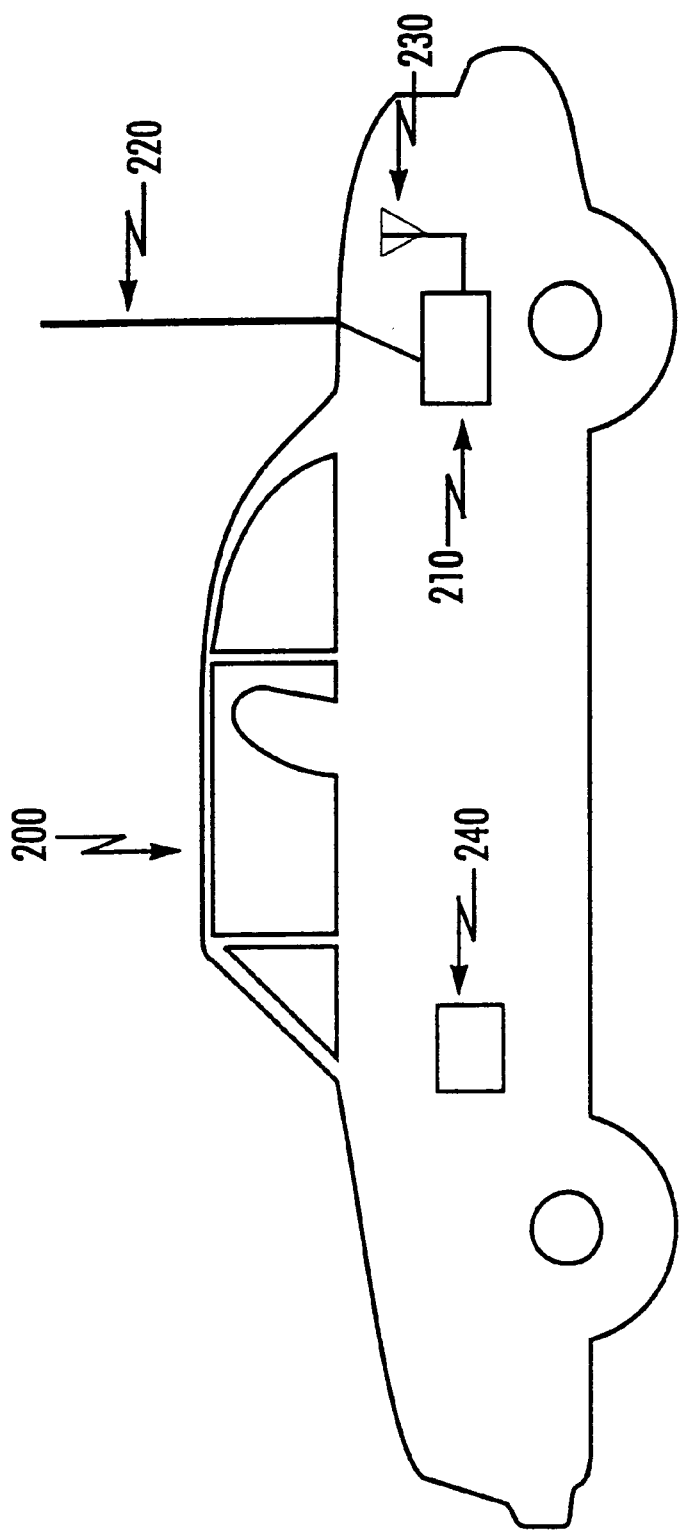
FIG. 2 is an illustration of the vehicle in which the apparatus of FIG. 1 has been mounted in an exemplary installation.

FIG. 2 is an illustration of the vehicle in which the apparatus of FIG. 1 has been mounted in an exemplary installation. Mounted in the rear of vehicle 200 is a housing 210 containing most of the electronics shown in FIG. 1. An antenna 220 serves as an antenna for the radio or radiotelephone communications. It may also be configured to serve as the antenna for the global positioning satellite signals. Auxiliary antenna 230 is shown which is not accessible from the exterior of the car and which serves to transmit and receive information in the event that antenna 220 is damaged. Housing 210 contains, inter alia, the CPU 100 shown in FIG. 1. Driver compartment electronics, shown symbolically as 240 in FIG. 2, includes the operator controls, an optional hands free radio microphone and speaker, and touch screen display 130 which also serves to display GPS navigation information, including the moving map information.

Figure 3:
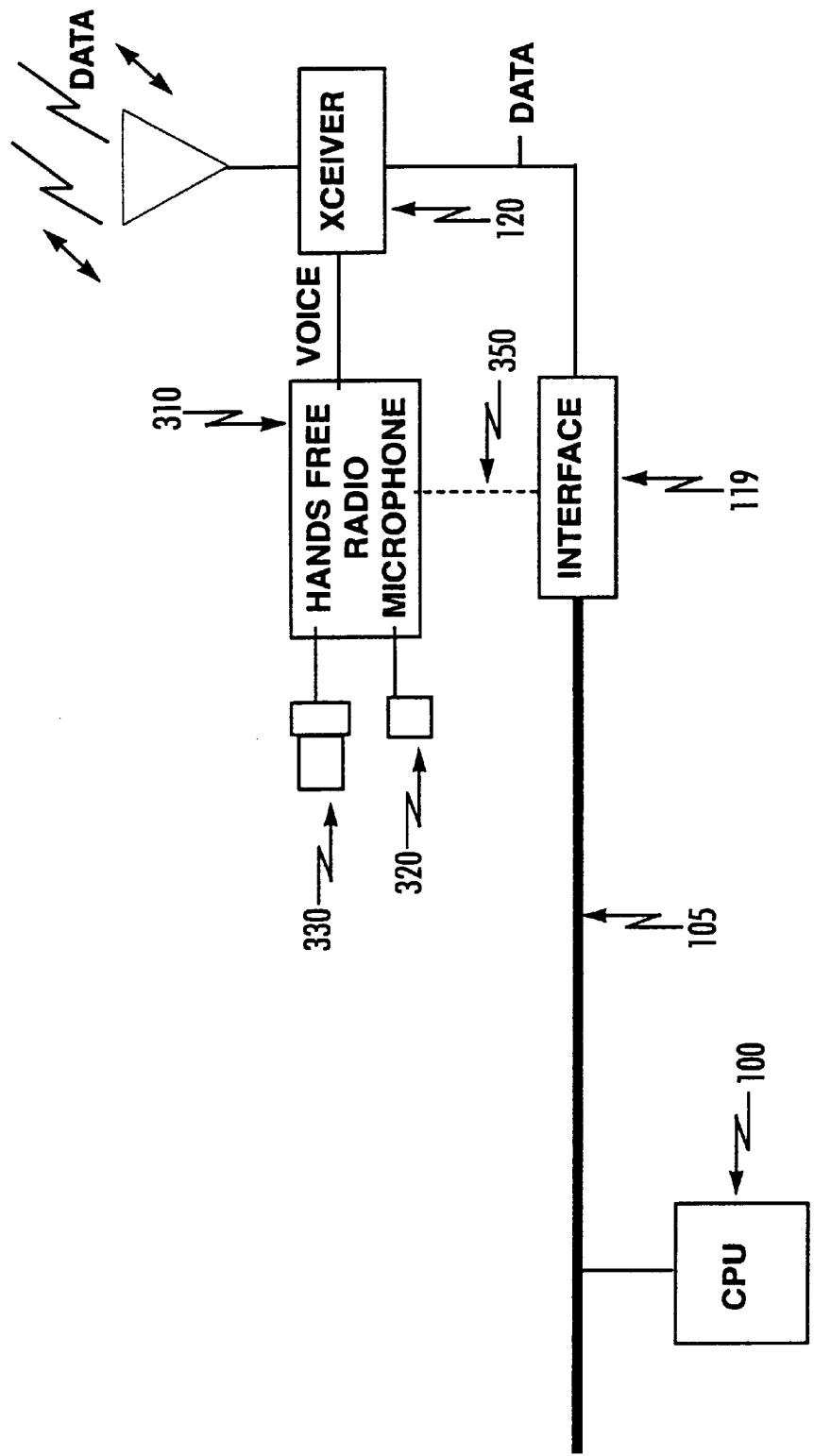
FIG. 3 illustrates the voice and data paths in the diagram shown in FIG. 1.

FIG. 3 illustrates the voice and data paths in the diagram shown in FIG. 1. In FIG. 3, transceiver 120 can be either a cellular telephone transceiver or a radio transceiver. As indicated, it can both receive and send voice and data. The voice and data typically follow different paths after being received. The principal voice path is over hands free radio microphone 310 which receives voice information from and transmits voice information to the user over microphone 320 and speaker 330. Hands free microphone 310 can be either analog or digital in its technology. If it is analog, a digital to analog converter may be utilized to convert voice to digital for connection over optional path 350 to the computer bus.

Figure 4:
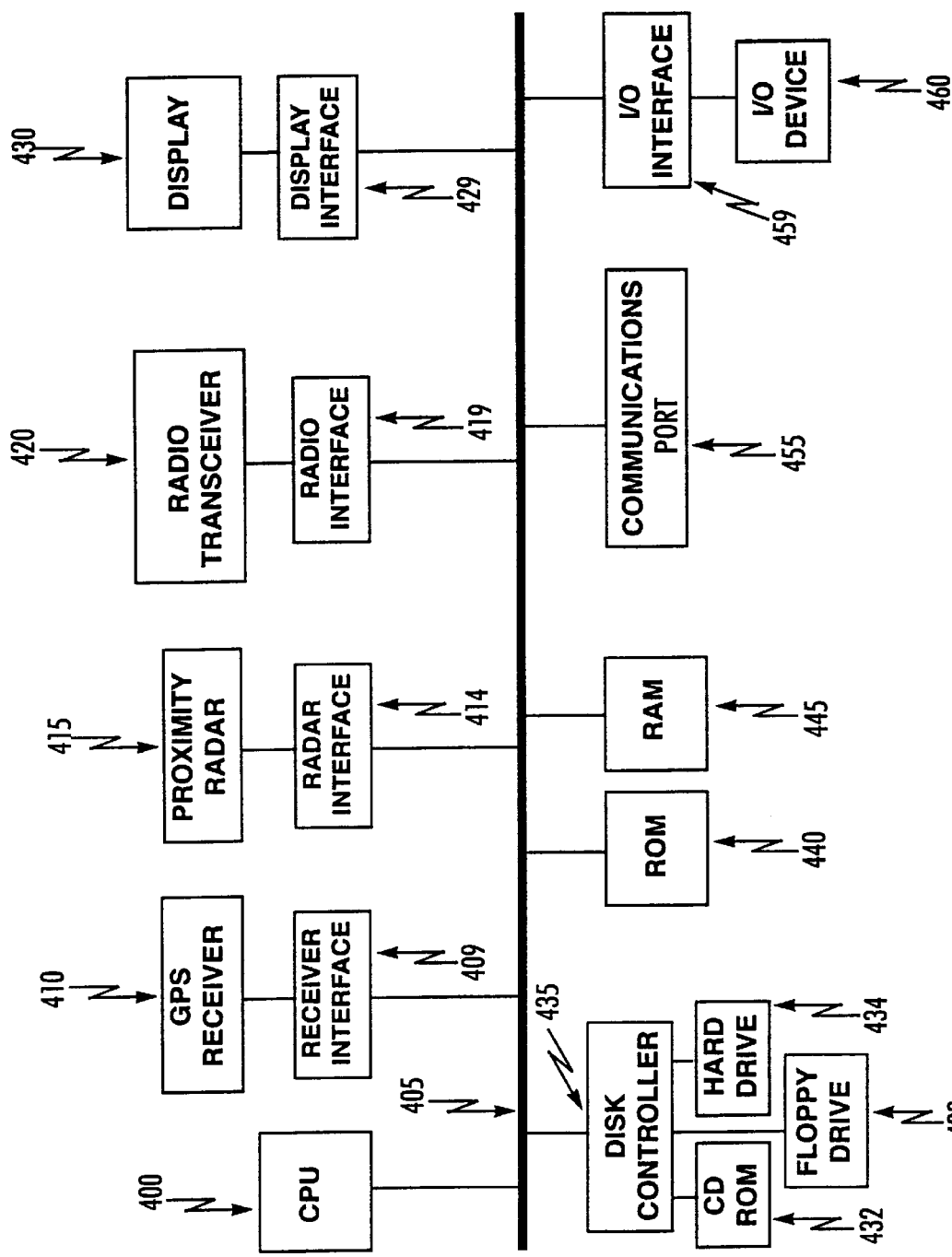
FIG. 4 is a block diagram of an apparatus suitable for carrying out that portion of the invention that resides at a stationary radar site.

FIG. 4 is a block diagram of an apparatus suitable for carrying out that portion of the invention that resides at a stationary radar site. It has a bus 105 and a CPU 100 which does all processing associated with information used in accordance with the invention. GPS receiver 110, connected to the bus by receiver interface 109, detects the location of the GPS receiver antenna. Though this device is stationary, it may not be permanently located at one site. For example, the device may be moved to various sites during the course of a day based upon varying traffic conditions. It is to enable this functionality that the GPS receiver 110 is included.

Proximity radar 115 and radar interface 114 are also connected to the bus. Radio transceiver 120 are connected via radio interface 119 to the bus. Display 130 is connected to the bus over display interface 129.

Optional disk controller 135 manages one or more disk drives which could be CD ROM 132, floppy drive 133 or hard drive 134. These drives are merely symbolic of a number of disc drives which might be accommodated by the computer system. Typically, these would include a floppy disc drive such as 133, a hard disc drive such as 134, and a CD ROM drive indicated by 132. The number and types of drives varies, typically, with different computer configurations.

Bus 105 serves as a main information highway interconnecting the other components of the computer. A CPU 100 is a central processing unit of the system, performing calculations and logic operations required to execute a program. Read only memory 140 and Random Access Memory 145 constitute the main memory of the computer. The disc controller 135 and associated drives are convenient, but optional if other means are available for loading programming and other information into the computing system. Such an alternative might be plugging in preprogrammed ROM into a socket connected to the computer bus.

Communications port 155 is optional but would typically constitute an RS 232 slot for connection to external devices. I/O devices 160, such as a mouse or a keyboard are connected to the bus over I/O interface 159. The use and operation of the various devices connected to the bus will become apparent from descriptions given hereinafter.

Figure 5:
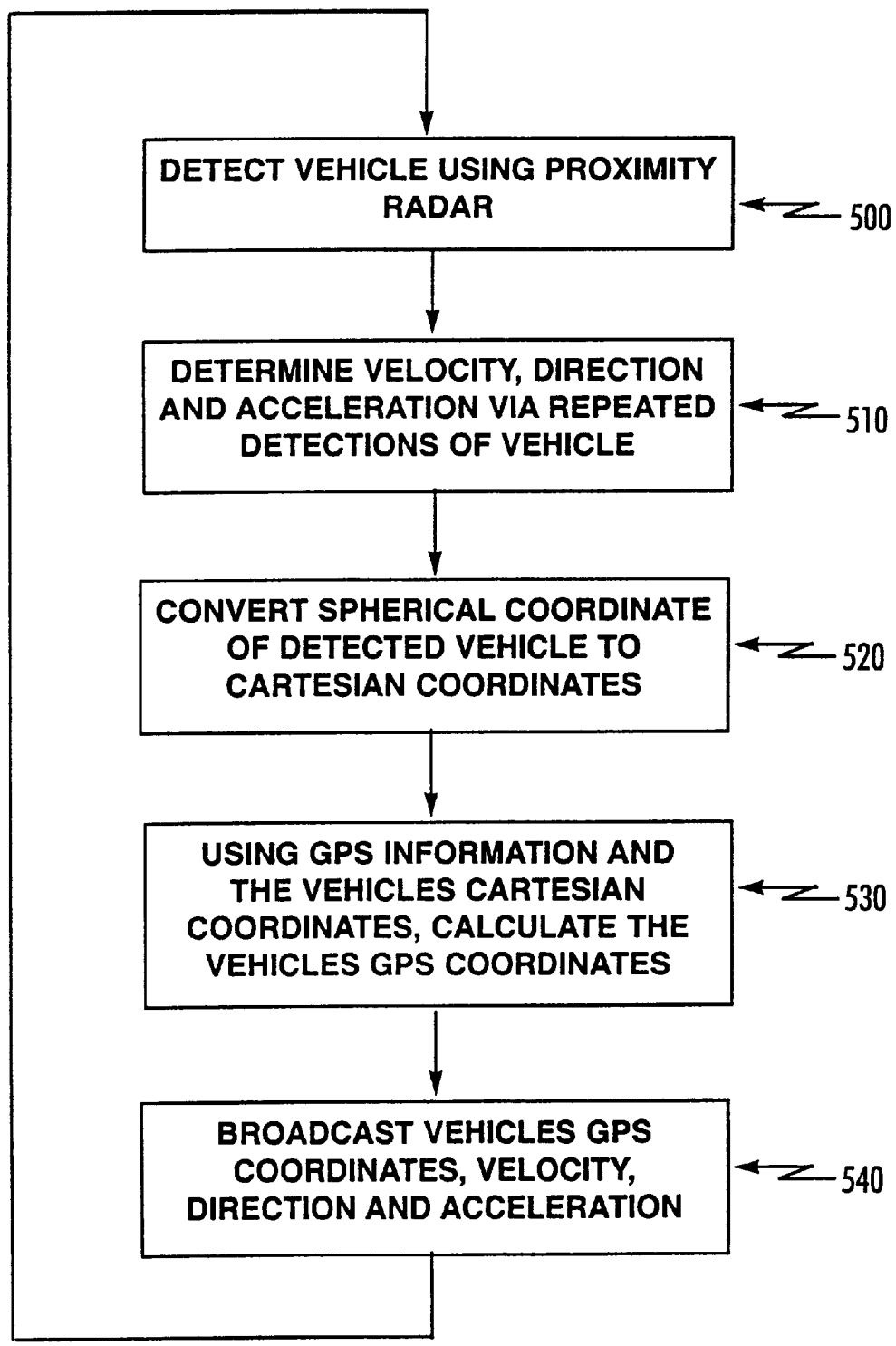
FIG. 5 is a flow chart of a process for converting the stationary radar information into the format required by the portion of the invention that resides within the vehicle.

FIG. 5 is a flow chart of a process for converting the stationary radar information into the format required by the portion of the invention that resides within the vehicle. For each vehicle within the range of the radar the following process occurs: The vehicle is initially detected 500 and then repeatedly detected over time until sufficient data is available to compute the vehicle's velocity, direction and acceleration 510. The x-y (Cartesian) coordinates reported by the radar device are converted into Cartesian coordinates 520. Using the GPS receiver, the Cartesian coordinates from 520 are updated with the GPS coordinates to calculate the true GPS coordinates of the vehicle 530. Those coordinates, and the velocity, direction and acceleration data, are then broadcast to all enabled vehicles 540. The process begins again at 500 for each vehicle detected so that the broadcast information may be updated.

Figure 6:
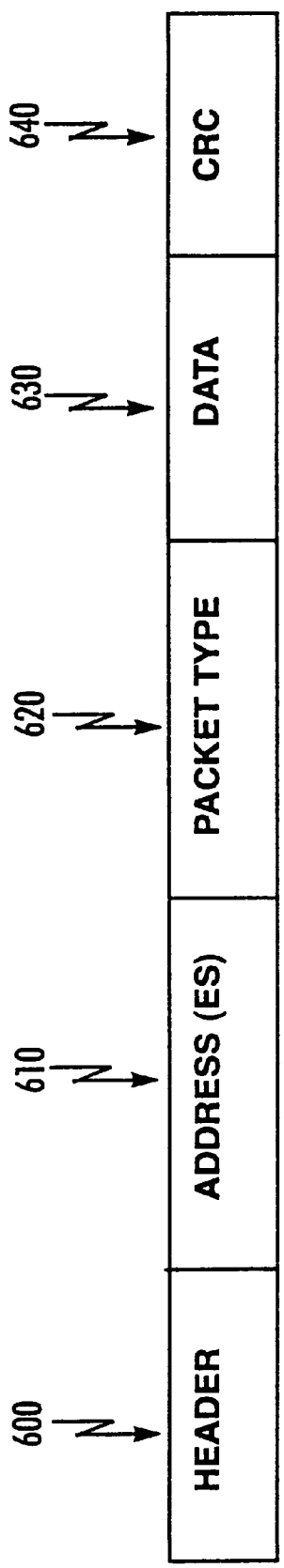
FIG. 6 is an exemplary packet format suitable for use in accordance with the invention.

FIG. 6 is an exemplary packet format suitable for use in accordance with the invention. This exemplary packet format corresponds to packets utilized in CSMA/CD protocols. Each packet has a header 1400, one or more addressees 1410, a packet type 1420 a data field 1430 and a cyclic redundancy code (CRC) 1440. As is known in the art, the header of the packet is utilized to establish synchronization and to prepare receiving equipment to partition the information. In the address block, 1410, the addresses of both the originating and destination stations are preferably included. The address field 1410 may also include a broadcast or a multiple address flag indicating that the packet is directed to more than one station. Packet types can include, for example, an indication that this packet is based the stationary radar system which would indicate to the vehicle's system that the data contained should be displayed in a particular way. Clearly, other packet types may be convenient or useful in the handling of the protocol.

FIG. 7 is a diagram of the structure of the data portion of the packet format in FIG. 6. The date and time the packet was created 700 is required to allow the receiving vehicle to make appropriate calculations to project the position of the sender when the packet is received and processed. This data item is especially important when collisions occur while utilizing the CSMA/CD protocol. The GPS receiver coordinates (which are the coordinates of the vehicle) 710 are also required. The radio frequency that the sending vehicle will monitor for voice communication 720 provides the necessary information for the receiving vehicle to tune its radio transmitter if voice communication is desired. The sender may not wish to accept voice communication, so the data element is optional. Velocity 730, direction 740 and acceleration 750 are also optional data elements because the receiver's device can compute those data elements after receiving subsequent packets. The vehicles make/model 760 and color 770 are required in order to provide enhanced information on the receiving vehicle's color display.

Figure 8:
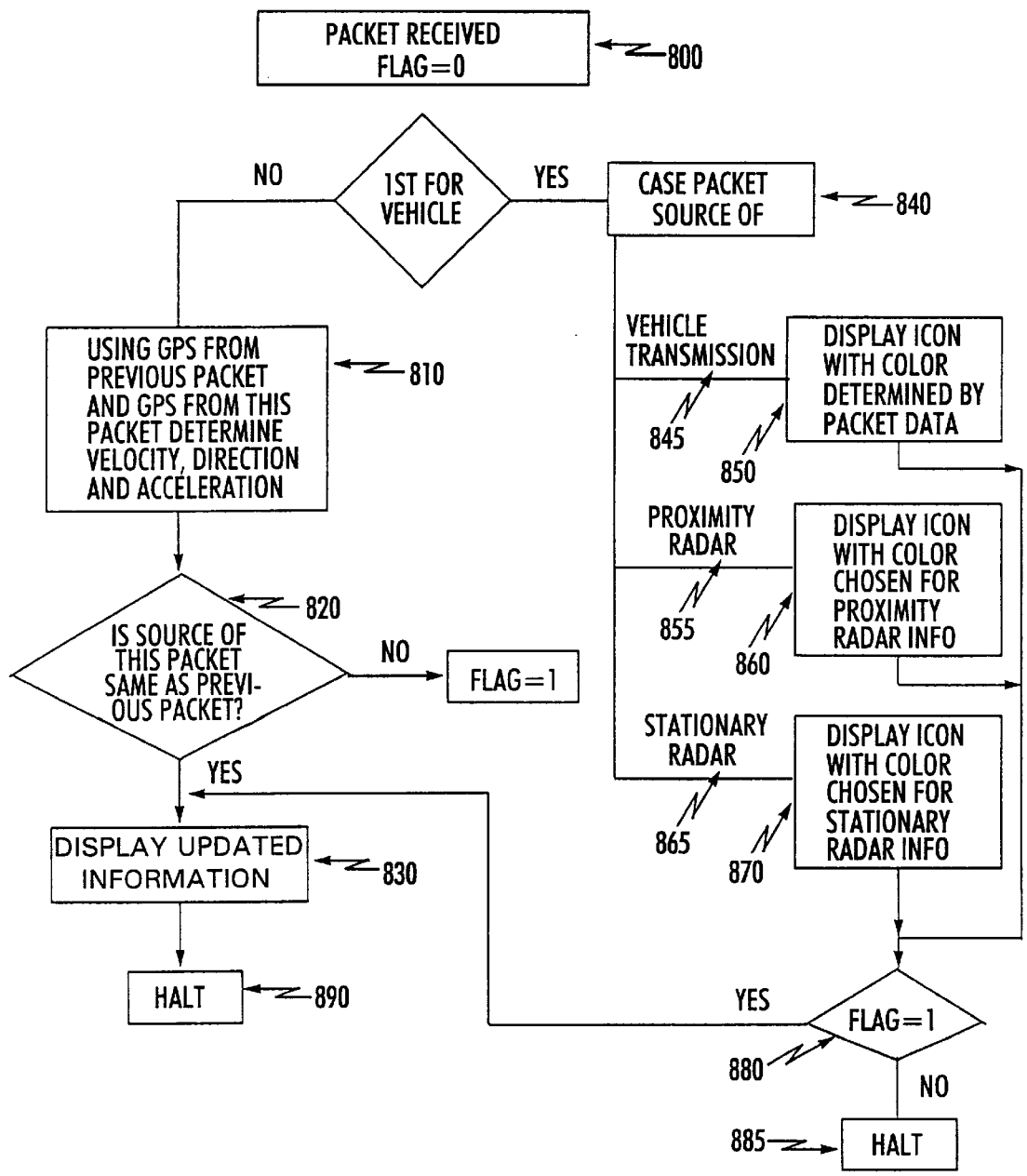
FIG. 8 is a flow chart of a process for accepting and processing data received from other vehicles, the proximity radar and the stationary radar system.

FIG. 8 is a flow chart of a process for accepting and processing data received from other vehicles, the proximity radar and one or more stationary radar system. For illustrative purposes, it is assumed that the proximity radar information is placed into the packet format described in FIG. 6. A packet is received 800 and a flag, whose purpose will be made clear below, is set to zero. If the packet is the first received from a vehicle 805 then an icon representing that vehicle is immediately displayed. The exact coloring and shape of the icon is dependent upon the source of the packet 840. If the packet was received from a vehicle 845 then the icon will take one form and will be colored the same as the color information contained within the packet 850. If the packet was received from the proximity radar 855 then the icon will take a different form and color to indicate to the driver the source of the packet 860. If the packet was received from a stationary radar device (as indicated in the packet's address data element) 865 then the icon is displayed in a different form and color to indicate to the driver the source of the packet 870. If the flag has the value of zero 880 then the process is terminated 885. If the flag has a value of one 880 then previous packets about this vehicle were received but the current packet was from a different source, so the display sequence beginning at 840 must be followed to ensure that the format of the icon displayed is consistent with the origin of the packet. Since the flag equals one, previous data referring to the vehicle was available and the updated information is displayed 830 and the process is terminated 890.

However, if the current packet is not the first packet received containing information about a vehicle 805, then the data in the current packet and the data from one or more most recent previous packet are used to compute the velocity, direction and acceleration 810. If the current packet's source is different from its predecessor 820 then the flag is set to one and processing proceeds from 840. If the source of both packets is the same 820 then the display is updated to show the (new) computed data 830 and the process is terminated.

Figure 9A:
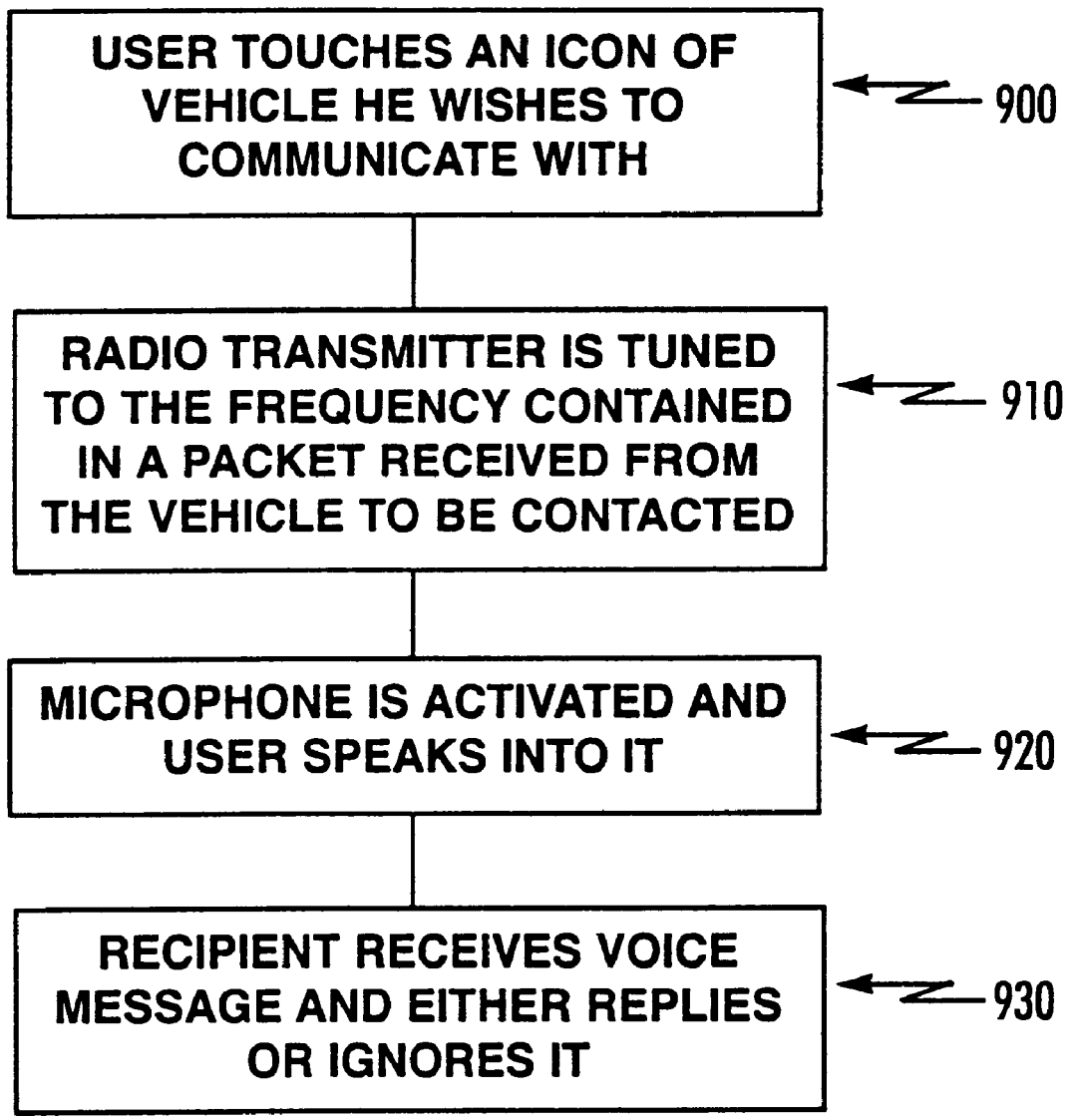
FIGS. 9A and 9B are flow charts of two processes for establishing a voice communication link between two vehicles.

FIG. 9A is a flow chart of a process for establishing a voice communication link between two vehicles. The driver pushes the icon of the vehicle he wishes to communicate with on the touch screen 900. His tunable radio transmitter is tuned to the frequency contained within the data portion of the packets previously received from the vehicle he wishes to communicate with 910. The microphone is activated and the driver speaks into it what he wishes to say 920. The recipient receives the voice communication and either responds to the communication or ignores it 930.

Figure 9B:
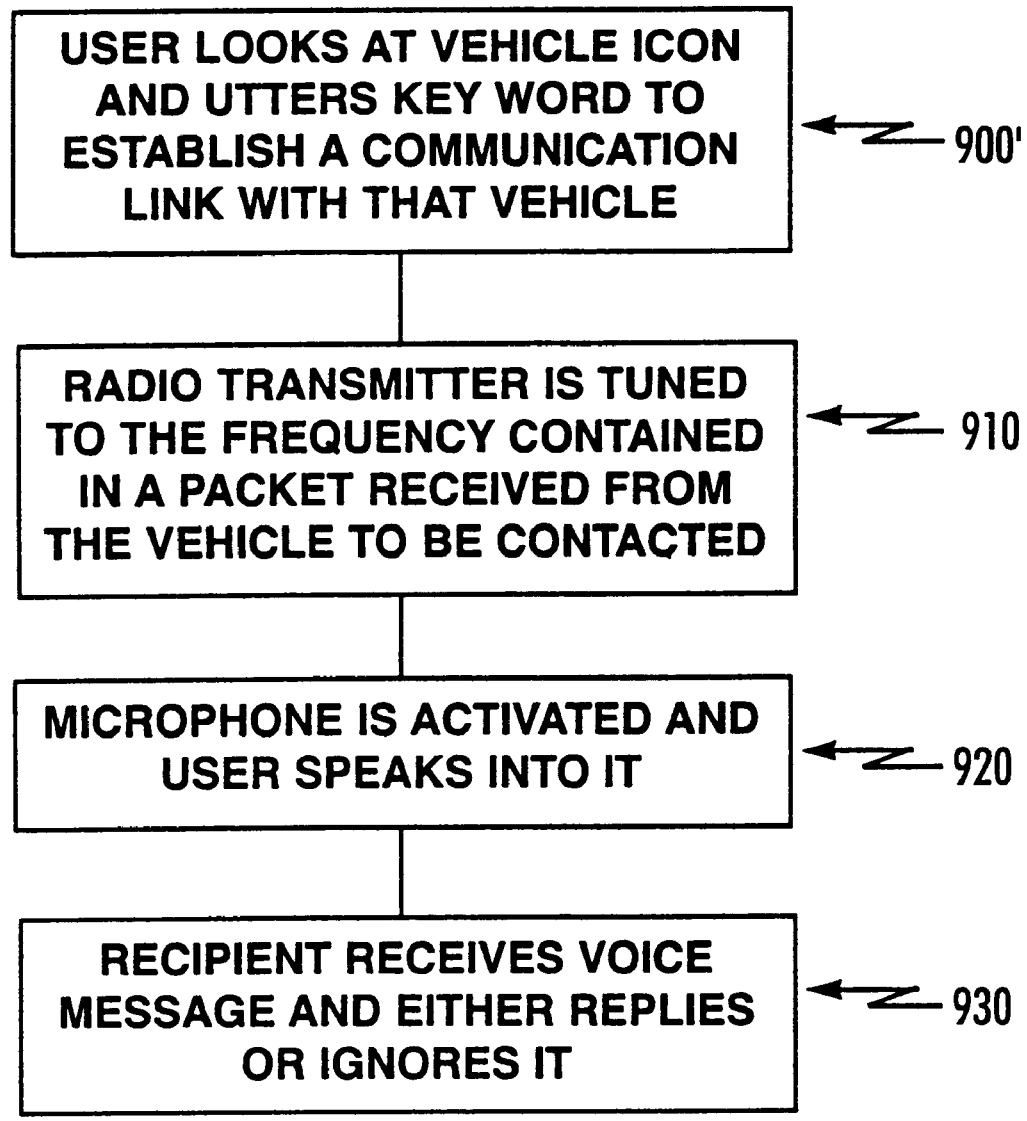

FIG. 9B is a flow chart of an alternative process for establishing a voice communication link between two vehicles. FIG. 9B parallels FIG. 9A with the exception of block 900'. In this alternative, the user looks at a vehicle icon and utters a key word to establish communication link with that vehicle. The position of the user's eyes is detected by the eyetracker and when the user's eyes fix on a vehicle, and the user utters the appropriate key word or, rather than uttering a key word, the projected collision data indicates that a collision is imminent, the communication link is open with that vehicle to permit a verbal warning.

Figure 10:
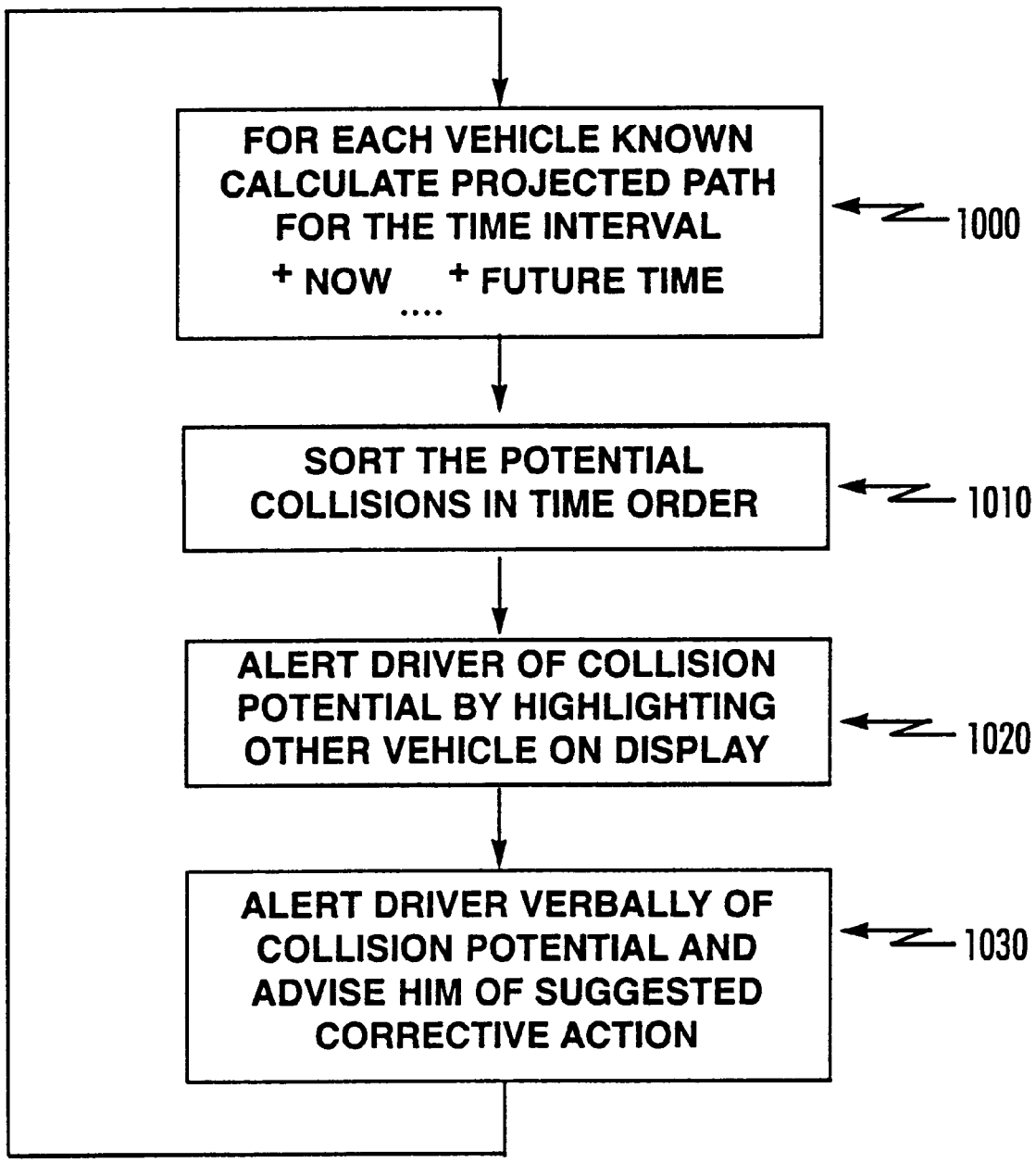
FIG. 10 is a flow chart of a process for collision avoidance in accordance with the invention.

FIG. 10 is a flow chart of a process for collision avoidance in accordance with the invention. For each vehicle known to the system, its projected path for a time interval t(now) through t(future time) is calculated 1000. If the path of the driver's vehicle crosses that of another within a narrow period of time (projected into the future), then a collision is predicted for some time t(collision) in the future. All such predictions are sorted in time order 1010 with the soonest potential collision communicated to the driver. The driver is alerted by highlighting on the display which vehicle his vehicle will collide with 1020 and by verbal statements from the system such as "Danger!" and with instructions for avoiding the collision such as "Brake now!" 1030.

In this manner, the user can become aware of the position of all vehicles about him in a safe and reliable way which enables him to avoid collisions and to overcome the problems of the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus mounted in a vehicle for avoiding collisions, comprising:
   a. a GPS receiver;
   b. a transceiver; and
   c. a computer connected to said GPS receiver and to said transceiver and configured to receive location information from said GPS receiver and transmit it over said transceiver for reception by other vehicles and to receive location information from at least one vehicle together with color information specifying the color of said at least one vehicle in which vehicle locations are displayed on a display device in one or more colors specified by said color information.

2. Apparatus mounted in a vehicle for avoiding collisions, comprising:
   a. a GPS receiver;
   b. a transceiver; and
   c. a computer connected to said GPS receiver and to said transceiver and configured to receive location information from said GPS receiver and transmit it over said transceiver for reception by other vehicles, in which said computer is configured to determine which, if any, other vehicles constitute a collision threat based on location information received from said vehicles over said transceiver and to establish an audio communication link between an operator of the vehicle automatically with at least one of said other vehicles if said at least one of said other vehicles constitutes a collision threat.

3. A system for avoiding collisions, comprising:
   a. a plurality of vehicles equipped with a receiver for determining vehicle location, at least one of which is also equipped with a proximity radar;
   b. said vehicles each having a transceiver for transmitting its location and receiving location information from other vehicles and a computer for determining from received location information, if received location information is available, or from location information provided by said proximity radar, if received location information is not available, or from both received location information and proximity radar, whether another vehicle constitutes a collision threat; and
   c. an alarm for alerting a vehicle operator if a collision threat exists.

4. The method apparatus system of claim 3, in which the proximity radar is a micropower impulse radar.

5. A method of avoiding collisions, comprising the steps of:
   a. providing an element for performing a step of receiving vehicle location information from other vehicles;
   b. providing an element for performing a step of calculating whether a vehicle is a collision threat based on received location information; and
   c. providing an element for performing the step of automatically establishing an audio communication link between vehicle operators if that vehicle is a vehicle associated with a calculated collision threat.

6. A computer program product, comprising:
   a. a memory medium; and
   b. a computer program stored on said memory medium, said program comprising instructions for receiving vehicle location information from other vehicles, calculating whether a vehicle is a collision threat based on received location information, and automatically establishing an audio communication link between vehicle operators if that vehicle is a vehicle associated with a calculated collision threat.

* * * * *